Patented Feb. 27, 1945

2,370,549

UNITED STATES PATENT OFFICE 2,370,549

VINYL ESTER AND METHOD OF PREPARATION THEREOF

Frederick E. Küng, Akron, Ohio, assignor to Pittsburgh Plate Glass Company, Pittsburgh, Pa., a corporation of Pennsylvania No Drawing. Application February 29, 1944,
Serial No. 524,481

6 Claims. (Cl. 260—78)

This invention relates to monomeric and polymeric methyl vinyl carbonate and methods for the preparation and recovery thereof.

In the prior art to which this invention relates, carbonate esters have been prepared by treating alcohols with phosgene in the presence of alkaline reagents to form dicarbonates directly. Likewise, alcohols have been treated with phosgene to form chloroformates which are then reacted with more alcohols or other hydric compounds to form mixed esters of carbonic acid.

Vinyl alcohol does not exist in monomeric state and in this respect it differs from other alcohols. Consequently, monomeric carbonic acid esters thereof cannot be prepared by the foregoing methods. Thus, the art is wanting in regard to vinyl esters of carbonic acid and methods of preparing the same.

I have discovered that when ethylene bis (methoxy carboxylate), a compound having the structural formula

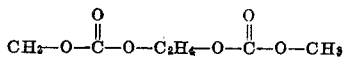

is subjected to pyrolysis, monomeric methyl vinyl carbonate,

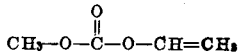

is formed in substantial amounts as a decomposition product.

The starting material, ethylene bis (methoxy carboxylate) is conveniently prepared by reacting monoethylene glycol with somewhat in excess of a di-molar proportion of methyl chloroformate in the presence of a basic reagent, such as pyridine. The methyl chloroformate is obtained by treating methanol with phosgene at temperatures between 20 and 30° C.

According to the invention, the starting material is subjected to pyrolysis in a cracking still by either a batch or continuous treatment. Advantageously, the starting stock is vaporized and then continuously introduced in the vapor phase into a tube still where it is subjected to temperatures between 400 and 700° C. during passage through the cracking tubes.

The gaseous products of pyrolysis are mainly methyl vinyl carbonate, methanol and carbon dioxide. Some acetylene, methane and ethylene carbonate are also formed. Ordinarily, the methyl vinyl carbonate, methanol and ethylene carbonate are recovered by passing the gaseous still effluent through a water cooled condensing system and a trap cooled with dry ice and acetone. Methane, CO₂ and acetylene are discharged from the condenser as fixed gases.

Methyl vinyl carbonate is recovered from the condensate in substantially pure state by fractional distillation. The new monomeric compound is recovered as a liquid fraction boiling between 99 and 100° C. at 735 mm. pressure.

Alternatively, the hot still gases may be passed directly into a fractionating column and there fractionated to recover methyl vinyl carbonate in any desired degree of purity.

In monomeric form, the new compound is a colorless liquid of relatively low viscosity. The monomer is readily polymerized in the presence of organic peroxide or percarbonate catalysts to yield a thermoplastic polymer which is quite hard at room temperature. If polymerization of the monomer is incomplete, softer thermoplastic resinous masses are produced. The new compound may be co-polymerized with styrene, methyl methacrylate, vinyl acetate and neoprene to form other modified resinous products.

The following specific example is illustrative:

Example

A glass cracking tube of two inch internal diameter and closed at one end was suspended in a horizontal position in a muffle type furnace. Ethylene glycol bis (methyl carbonate) was passed into the tube from a dropping funnel at a rate of about 2 cc. per minute while the tube was maintained at temperatures between 600° C. and 625° C. The vapors evolved by pyrolysis were condensed at the temperature of dry-ice by surrounding a receiving flask with a mixture of acetone and dry-ice. The condensed product was fractionated by separating the fraction boiling between 92° C. and 100° C. Further distillation yielded a colorless liquid monomeric methyl vinyl carbonate, having a boiling point of 99° C. to 100° C. at 735 mm.

A small amount of the new monomer was mixed with 0.5 percent of benzoyl peroxide and heated at 70° C. for one hour. A colorless, solid resin was produced.

What I claim is:

1. A method of forming methyl vinyl carbonate which comprises pyrolyzing ethylene bis (methoxy carboxylate).

2. A method of forming methyl vinyl carbonate which comprises thermally decomposing ethylene bis (methoxy carboxylate) at a temperature between 400° C. and 700° C.

3. A method which comprises introducing ethylene bis (methoxy carboxylate) into a cracking still, thermally decomposing the ethylene bis (methoxy carboxylate) therein, withdrawing gaseous decomposition products from the still and condensing a fraction thereof containing methyl vinyl carbonate.

4. Methyl vinyl carbonate.

5. A thermal decomposition product of ethylene bis (methoxy carboxylate) containing a major proportion of methyl vinyl carbonate and being a liquid boiling between 92° C. and 100° C. at 735 mm. pressure.

6. Polymeric methyl vinyl carbonate.

FREDERICK E. KÜNG.